United States Patent
Oh et al.

(10) Patent No.: US 7,480,486 B1
(45) Date of Patent: Jan. 20, 2009

(54) WIRELESS REPEATER AND METHOD FOR MANAGING AIR INTERFACE COMMUNICATIONS

(75) Inventors: Dae-Sik Oh, Overland Park, KS (US); Mark L. Yarkosky, Overland Park, KS (US); Saad Z. Asif, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 11/311,819

(22) Filed: Dec. 19, 2005

Related U.S. Application Data

(63) Continuation-in-part of application No. 10/659,647, filed on Sep. 10, 2003.

(51) Int. Cl.
*H04B 3/36* (2006.01)

(52) U.S. Cl. ............... 455/7; 455/9; 455/11.1; 455/13.1; 455/16; 455/63.3; 370/315; 370/328

(58) Field of Classification Search ............... 455/436, 455/437, 438, 439, 442, 444, 11.1, 13.1, 455/13.4, 7, 8, 9, 522, 16, 17, 67.11, 67.13, 455/67.16, 450, 451, 452.1, 452.2, 509, 114.2, 455/441, 443, 445, 10, 561, 562, 15, 62, 455/63.3, 440; 370/395.1, 274, 279, 315, 370/501, 328, 329, 331
See application file for complete search history.

(56) References Cited

U.S. PATENT DOCUMENTS

| 5,293,172 A | | 3/1994 | Lamberty et al. |
| 5,504,935 A | * | 4/1996 | Vercauteren ............... 455/438 |
| 5,534,872 A | | 7/1996 | Kita |
| 5,628,052 A | | 5/1997 | DeSantis et al. |
| 5,812,935 A | | 9/1998 | Kay |
| 5,832,368 A | * | 11/1998 | Nakano et al. ............. 455/63.1 |

(Continued)

FOREIGN PATENT DOCUMENTS

WO    WO 9927747 A1 *  6/1999

(Continued)

OTHER PUBLICATIONS

Lehne and Pettersen, "An Overview of Smart Antenna Technology for Mobile Communications Systems," IEEE Communications Surveys, vol. 2, No. 4, 1999.

(Continued)

*Primary Examiner*—Charles N Appiah
*Assistant Examiner*—Olumide T Ajibade Akonai

(57) ABSTRACT

A wireless repeater and method for managing air interface communications is provided. A repeater may include a donor antenna, a coverage antenna, a mobile station modem, a processor, and data storage. The donor antenna will receive a plurality of air interface beams on the forward link from a radio access network. The coverage antenna will pass each forward link beam received to a mobile station being served by the repeater. Further, the donor antenna will pass each forward link air interface beam to the MSM, where the MSM will apply a rake receiver to identify a signal characteristic of the forward link of each beam received, and the processor will record in the data storage the signal characteristic corresponding to each beam. Given this data, the repeater will select an air interface beam with the most preferable signal characteristic, and will keep only this beam active for reverse link communications.

20 Claims, 7 Drawing Sheets

U.S. PATENT DOCUMENTS

| | | | |
|---|---|---|---|
| 5,883,884 A * | 3/1999 | Atkinson | 370/279 |
| 5,907,794 A | 5/1999 | Lehmusto et al. | |
| 5,970,061 A | 10/1999 | Koludo | |
| 6,005,530 A | 12/1999 | Jovanovich | |
| 6,005,884 A | 12/1999 | Cook et al. | |
| 6,006,075 A | 12/1999 | Smith | |
| 6,035,218 A | 3/2000 | Oh et al. | |
| 6,108,323 A | 8/2000 | Gray | |
| 6,433,737 B2 | 8/2002 | Katz | |
| 6,459,881 B1 * | 10/2002 | Hoder et al. | 455/11.1 |
| 6,515,635 B2 | 2/2003 | Chiang | |
| 6,567,460 B1 | 5/2003 | Tak et al. | |
| 6,600,918 B1 | 7/2003 | Youngs et al. | |
| 6,600,934 B1 | 7/2003 | Yun et al. | |
| 6,609,012 B1 | 8/2003 | Malmgren et al. | |
| 6,611,695 B1 | 8/2003 | Periyalwar | |
| 6,697,642 B1 | 2/2004 | Thomas | |
| 6,718,158 B1 * | 4/2004 | Suonvieri | 455/9 |
| 6,731,905 B2 | 5/2004 | Ogino et al. | |
| 6,751,480 B2 | 6/2004 | Koglantis et al. | |
| 6,778,809 B2 | 8/2004 | Morimoto | |
| 6,782,277 B1 | 8/2004 | Chen et al. | |
| 6,795,018 B2 | 9/2004 | Guo | |
| 6,799,024 B2 | 9/2004 | Wang et al. | |
| 6,801,790 B2 | 10/2004 | Rudrapatna | |
| 6,804,491 B1 * | 10/2004 | Uesugi | 455/11.1 |
| 6,816,732 B1 | 11/2004 | Farley et al. | |
| 6,834,198 B1 | 12/2004 | Hachenberger et al. | |
| 6,862,430 B1 * | 3/2005 | Duffy et al. | 455/11.1 |
| 6,993,287 B2 | 1/2006 | O'Neill | |
| 7,003,261 B2 | 2/2006 | Dietz et al. | |
| 2002/0028675 A1 * | 3/2002 | Schmutz et al. | 455/424 |
| 2002/0072357 A1 | 6/2002 | Matsuda | |
| 2002/0132600 A1 | 9/2002 | Rudrapatna | |
| 2002/0187812 A1 | 12/2002 | Guo | |
| 2002/0187813 A1 | 12/2002 | Guo | |
| 2003/0013410 A1 * | 1/2003 | Park | 455/11.1 |
| 2003/0032453 A1 | 2/2003 | Katz et al. | |
| 2003/0124976 A1 | 7/2003 | Tamaki et al. | |
| 2003/0143948 A1 | 7/2003 | Han et al. | |
| 2003/0162550 A1 | 8/2003 | Kuwahara et al. | |
| 2003/0220109 A1 | 11/2003 | Jami et al. | |
| 2003/0222818 A1 | 12/2003 | Regnier et al. | |
| 2004/0146013 A1 | 7/2004 | Song et al. | |
| 2004/0157645 A1 | 8/2004 | Smith et al. | |
| 2005/0068231 A1 | 3/2005 | Regnier et al. | |
| 2005/0170832 A1 | 8/2005 | Cooper | |
| 2005/0227619 A1 * | 10/2005 | Leet et al. | 455/22 |

OTHER PUBLICATIONS

Attar and Esteves, "A Reverse Link Outer-Loop Power Control Algorithm to cdma2000 1xEV Systems," ICC 2002, Apr. 2002.

Esteves et al., "Link Adaption Techniques for High-Speed Packet Data in Third Generation Cellular Systems," European Wireless Conference 2002.

Fan and Esteves, "The Impact of Antenna-array Receives on the Reverse Link Performance of CDMA2000 1xEV High Rate Packet Data Systems," VTC 2003.

Metawave "spotlight 2230" brochure, http://www.metawave.com/PDFs/Products/Integrated/SL2230_brochure.pdf, printed from the World Wide Web on May 21, 2002.

Office Action from U.S. Appl. No. 10/659,647, dated Jun. 30, 2005.
Office Action from U.S. Appl. No. 10/659,647, dated Dec. 29, 2005.
Office Action from U.S. Appl. No. 10/659,647, dated Apr. 7, 2006.
Office Action from U.S. Appl. No. 10/659,647, dated Aug. 25, 2006.
Office Action from U.S. Appl. No. 10/659,647, dated Sep. 24, 2007.

* cited by examiner

WIRELESS REPEATER AND METHOD FOR MANAGING AIR INTERFACE COMMUNICATIONS

CROSS-REFERENCE TO RELATED APPLICATION

This application is a continuation-in-part of U.S. application Ser. No. 10/659,647, filed Sep. 10, 2003.

FIELD OF INVENTION

The present invention relates to wireless communications, and more particularly, to wireless repeater functionality.

BACKGROUND

In a cellular wireless communication system, such as a code division multiple access (CDMA) system for instance, base stations are positioned throughout a coverage area and emit radio frequency radiation patterns that define cells. Mobile stations operating in a given cell may then wirelessly communicate with the serving base station, and the base station may provide connectivity with further network components such as switches and gateways that connect with transport networks.

In a CDMA system, each cell is typically divided into a number of sectors, each of which is identified by a specific pseudo-noise offset (i.e., "PN offset") of a specific spreading sequence that is used to encode communications with mobile stations operating in the cell. At any given instant, a mobile station may thus operate in a given sector, and may thereby communicate with the serving base station using the PN offset of that sector. (In practice, an idle mobile station may communicate on a single PN offset (i.e., in a single sector) at once; an active mobile, on the other hand, might communicate on multiple PN offsets (i.e., in multiple sectors) at once, although a dominant one of those active PN offsets might be the focus of communications at any given moment).

Unfortunately, in some wireless networks, the cells may not seamlessly cover an entire area, so there may be a hole in coverage between cells. To solve this problem, a wireless carrier may install a wireless repeater (repeater) that functions to extend the range of a given cell or sector, so as to fill in the hole in coverage. Such a repeater may be able to receive a signal distorted by transmission losses and to regenerate or replicate the signal. The repeater would include a donor antenna that would communicate with a base station, a coverage antenna that would communicate with mobile stations, and a build-out circuit that would boost communications from the base station to the mobile stations. For example, the repeater may be positioned between a mobile station and a base station to intercept signals sent between them. The repeater may amplify the power of these intercepted signals and send amplified versions of these signals to the mobile station or the base station. Therefore, the repeater may effectively extend the range of a given cell by boosting communications between a mobile station and a base station.

In practice, the donor antenna of a repeater may receive forward link signals from multiple base stations and multiple base station sectors (i.e., signals with multiple PN offsets), all of which comprise a radio access network, at once and boost all of those signals. In addition, the repeater will receive reverse link signals from mobile stations, boost the signals, and radiate the amplified reverse link signals to all nearby base stations. However, radiating the amplified reverse link signals to all nearby base stations can decrease the capacity of base stations that are not the intended recipient of the amplified signals by increasing the ambient noise level. Furthermore, even if the donor antenna of the repeater is set to radiate reverse link signals to a single base station, when that base station becomes loaded with primary traffic from the system (e.g., traffic not from the extended coverage of the repeater) the repeater traffic can cause a decrease in the overall capacity of the base station due to the noise rise at the base station caused by the noise generated by the repeater. An improvement is therefore desired.

SUMMARY

The present invention is directed to a wireless repeater and method for managing air interface communications. As described further below, a wireless repeater will communicate with a radio access network on multiple air interface beams, each having a forward link and a reverse link. In operation, the repeater will pass along to the mobile station substantially all of the forward link communications that the repeater receives from the radio access network on the various air interface beams. However, as the repeater receives reverse link communications from the mobile station, the repeater will pass those reverse link communications along to the radio access network on only one of the air interface beams, where that one air interface beam is selected based on an analysis of one or more forward link signal characteristics.

Thus, in one respect, the invention may take the form of a method. The method may be carried out by a wireless repeater, through which a mobile station communicates with a radio access network. In an exemplary arrangement, the method may include a wireless repeater communicating with a radio access network on a plurality of first air interface beams over a first air interface, and for each first air interface beam, passing communications received on the forward link of each first air interface beam along to the mobile station on a second air interface. The method may then further include selecting a given one of the first air interface beams based on the signal characteristic of the forward link of the given first air interface beam, receiving reverse link communications from the mobile station on the second air interface, and passing the received reverse link communications to the radio access network on only the selected first air interface beam.

By way of example, the signal characteristic may comprise either carrier-to-cochannel interference ratio, signal to noise ratio, or frame error rate. In each case, respectively, selecting the given first air interface beam based on the signal characteristic of the forward link of the given first air interface beam may comprise selecting the first air interface beam whose forward link has the highest carrier-to-cochannel interference ratio, highest signal to noise ratio, or lowest frame error rate. The selection may be made by determining the respective signal characteristic of the forward link of each first air interface beam, and comparing the signal characteristic of the forward links of at least two of the first air interface beams in order to select the first air interface beam whose forward link has the preferable signal characteristic. Further, the function of selecting the given first air interface beam may involve keeping the reverse link of the given first air interface beam active while deactivating the reverse links of the other first air interface beams.

In a further embodiment, the method may comprise subsequently handing off reverse link communications from the selected first air interface beam to another first air interface beam by performing a make-before-break handoff, in response to a determination that the other first air interface beam has a preferable signal characteristic. The determination to perform a handoff may be made by comparing the signal characteristic of the forward link of the given first air interface beam with the signal characteristic of the forward link of the other first air interface beam.

In another respect, the invention may take the form of a wireless repeater. The wireless repeater may include a donor antenna, a coverage antenna, and a mobile station modem. The donor antenna may be a phased array antenna, for example, and may be operable to communicate with the radio access network on a plurality of first air interface beams on a first air interface, and the coverage antenna may be operable to communicate with at least one mobile station on a second air interface. As an example, the donor antenna receives communications on the forward link of each first air interface beam and passes the communications to the mobile station modem, and the coverage antenna, for each first air interface beam, passes communications received from the mobile station modem along to the mobile station on the second air interface. Further, the wireless repeater selects a given one of the first air interface beams based on the signal characteristic of the forward link of the given first air interface beam, and also receives reverse link communications from the mobile station on the second air interface, and passes the received reverse link communications to the radio access network on only the selected first air interface beam.

In still another respect, the wireless repeater may also include a processor, which is operable to determine and record in data storage the signal characteristic of the forward link of each first air interface beam, and based on the signal characteristic, to select the given first air interface beam.

These as well as other features and advantages will become apparent to those of ordinary skill in the art by reading the following detailed description, with appropriate reference to the accompanying drawings.

BRIEF DESCRIPTION OF FIGURES

Exemplary embodiments of the present invention are described with reference to the following drawings, in which.

DETAILED DESCRIPTION OF EXEMPLARY EMBODIMENTS

Figure 1:
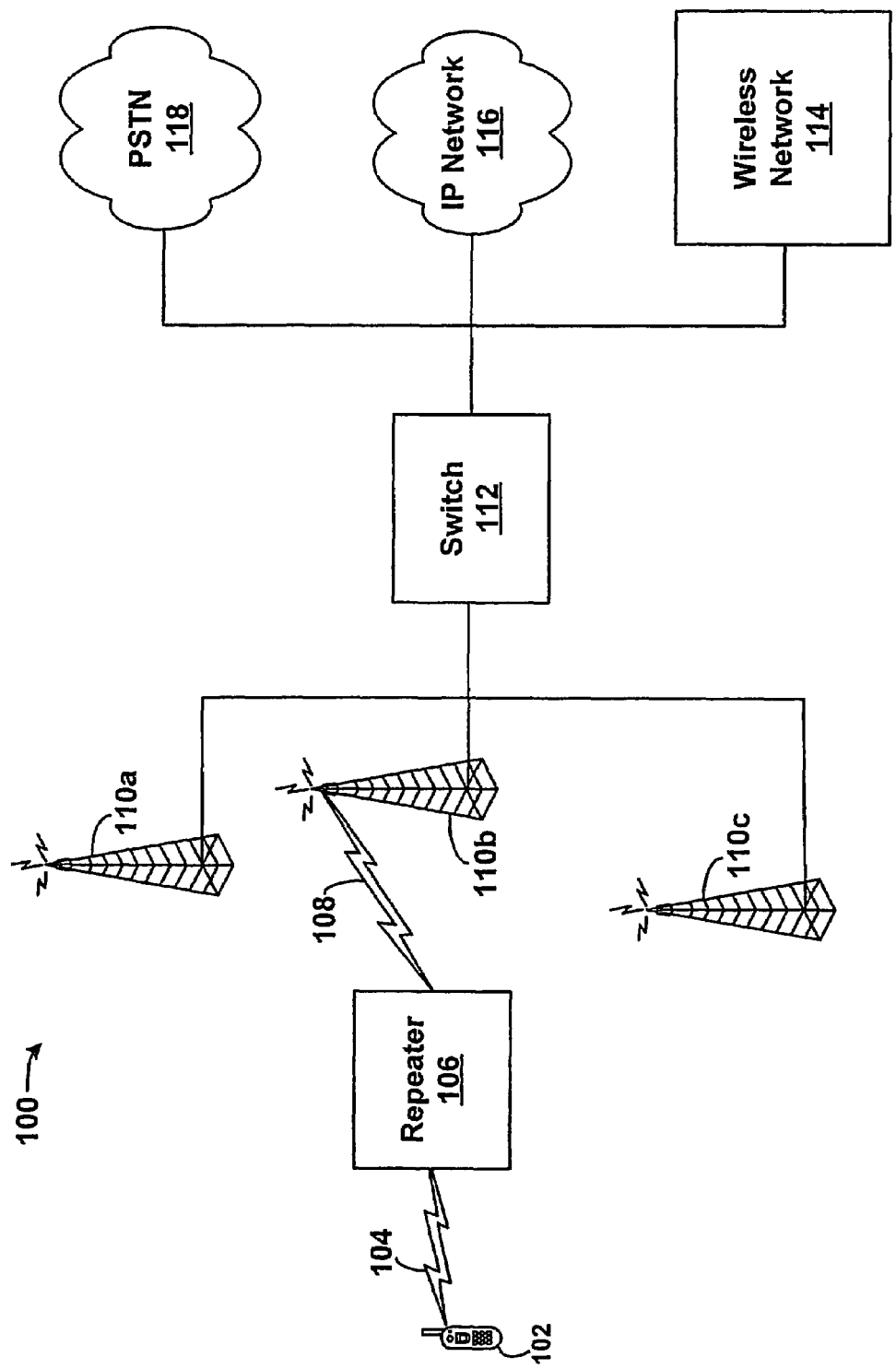
FIG. 1 is a block diagram illustrating one embodiment of a wireless communication network.

The exemplary embodiment of the present invention minimizes the number of reverse link air interface beams that a repeater keeps active. In this manner, the repeater may direct its retransmission of reverse link communications to a selected area, e.g., to a selected sector of a base station. According to the exemplary embodiment, a donor antenna of a repeater may be a smart antenna such as a phased array (PA) antenna that can dynamically (e.g., automatically in real time) point a narrow beam in a desired direction (e.g., by changing the phases of its various elements). The repeater may then include a coverage antenna, a mobile station modem (MSM), a processor and data storage. Preferably, the coverage antenna, MSM, PA, processor and data storage will be coupled together through a system bus or some other mechanism.

In an exemplary operation, the PA antenna will communicate with a radio access network on a plurality of air interface beams over an air interface between the PA antenna and radio access network. In addition, the coverage antenna of the repeater will communicate with at least one mobile station on another air interface. The processor will cause the PA antenna to receive the communications from a radio access network on the forward link of each air interface beam and pass the communications to the MSM. For each air interface beam received on the forward link, the coverage antenna may pass communications it receives from the MSM along to the mobile station on the other air interface. After receiving the communications, the MSM will then apply a rake receiver to identify PN offsets of the received signals (to distinguish the signals), measure a signal characteristic (such as a signal-to-noise ratio ($E_C/I_O$), carrier-to-cochannel interference ratio, or frame error rate) for each PN offset, and for each forward link air interface beam received, the processor will record in the data storage the PN offsets and its corresponding signal characteristic. The wireless repeater then selects an air interface beam based on the signal characteristic of the forward link of the given air interface beam. Given this data, when the coverage antenna of the repeater receives reverse link communications from the mobile station, the processor will instruct the PA antenna to pass the received reverse communication link to the radio access network on only the selected air interface beam.

As a result, the donor antenna of the repeater will transmit reverse link communications from the mobile station to the sector that is likely to supply the pilot signal with the highest signal-to-noise ratio, highest carrier-to-cochannel interference ratio, or lowest frame error rate. In this manner, the repeater will receive on the forward link a plurality of air interface beams from various sectors of a radio access network and pass each forward link communication to the mobile station, while at the same time sending reverse link communications from the mobile station to just one sector at a time. Furthermore, in this manner the repeater may extend the coverage area of the sector that carries the least amount of traffic at any given point in time.

By passing all of the forward link communications to the mobile station, the mobile station can maintain its normal active set. In addition, by continually receiving on the forward link a plurality of air interface beams from a plurality of corresponding base stations or sectors, the repeater may continually determine and compare the signal characteristic of each air interface beam, and dynamically select the most preferable air interface beam to keep active on the reverse link, while deactivating the reverse links of the other air interface beams.

As noted, the repeater may continually and dynamically determine which of the air interface beams has a forward link with the most preferable signal characteristic. For example, the signal characteristic may be carrier-to-cochannel interference ratio. If so, the repeater will determine the carrier-to-cochannel interference ratio respectively of the forward link of each air interface beam, and compare the carrier-to-cochannel interference ratio of the forward links of each air interface beam, and then select the air interface beam whose forward link has the highest carrier-to-cochannel interference ratio.

Similarly, the signal characteristic may be signal to noise ratio, and if so, the repeater will select the air interface beam whose forward link has the highest signal to noise ratio. In addition, the signal characteristic may be frame error rate, whereby the repeater will select the air interface beam whose forward link has the lowest frame error rate.

Further, for example, the repeater may handoff reverse link communications from the selected air interface beam to another air interface beam. As the mobile station moves between sectors, the repeater may determine that the currently selected air interface beam no longer has the most preferable signal characteristic. As such, the repeater may determine that another air interface beam has a more preferable signal characteristic. The repeater may make this determination by comparing the signal characteristic of the forward link of the selected air interface beam with the signal characteristics of the forward links of the other air interface beams. After making a determination to perform a handoff, the repeater may handoff the reverse link communications from the selected air interface beam to a more preferable air interface beam by performing a make-before-break handoff, i.e., establishing reverse link use of the second beam before discontinuing reverse link use of the first beam. Handing off reverse link communications allows a mobile station to engage in its normal soft handoff process and thus reduces the chance of dropping a call.

Wireless Network Architecture

Referring now to the figures, FIG. 1 is a block diagram illustrating one embodiment of a wireless communication network 100. It should be understood, however, that this and other arrangements described herein are set forth for purposes of example only, and other arrangements and elements can be used instead and some elements may be omitted altogether. Further, many of the elements described herein are functional entities that may be implemented as hardware, firmware or software, and as discrete components or in conjunction with other components, in any suitable combination and location.

As shown in the example arrangement of FIG. 1, network 100 includes a mobile station (MS) 102 coupled via link 104 to a repeater 106. In turn, repeater 106 is coupled via link 108 to a base station 110$b$. Base station 110$b$ and other base stations 110$a$ and 110$c$ are coupled to a switch 112, which is in communication with a wireless network 114, an Internet Protocol (IP) network 116, and a Public Switched Telephone Network (PSTN) 118. Switch 112 may also be in communication with other transport networks as well.

The network 100 may be divided geographically into a number of cell sites (or simply "cells"), which are defined by the coverage areas of respective base stations. Each base station transceives with a number of mobile stations that reside within its radio coverage area. In practice, base stations are deployed so that each cell partially overlaps with other cells in the vicinities of their boundaries. The overlapping of cells permits mobile stations to maintain continuous (or near continuous) communications with the called party while moving between cells.

Cells are arranged in clusters, and usually each cluster uses the entire allocated frequency spectrum. Clusters are designed in a fashion so that the limited spectrum is repeatedly used over large geographic areas, with each cluster supporting a substantially same numbers of users. Cochannel interference results from cells that are assigned the same frequency being spaced too close together. As the traffic increases on these cells, the interference rises as the amount of forward link communications (e.g., base station to the mobile) increases.

A cellular network should be designed to maximize the carrier-to-cochannel interference (C/I) ratio (or referred to as the Chip Energy to total Interference ratio ($E_C/I_O$), e.g., where $I=I_{SC}+I_{OC}$, and where SC is same cell interference and OC is other cell interference). The carrier-to-cochannel interference ratio is a ratio of the energy of a pilot signal to the total power in the channel. The total power in the channel includes the pilot signal, pilots from other base stations, traffic, and other channels and noise. One way to maximize the carrier to interference ratio is to increase the frequency re-use distance, i.e., increase the distance between cells using the same set of transmission frequencies. For example, in an advanced mobile phone system (AMPS) system, C/I is equal to about 18 dB and the minimum required separation of cells, based on C/I=18 dB, is about 4.6R, where R is the radius of the cell. This means that the signal from the communicating cell is 18 dB larger than the interfering signal coming from a neighboring cell (or cells). When the network is loaded with calls to its capacity, the received C/I is just sufficient to meet link requirements, but will not meet the requirements if another user is added to the link. Therefore, the C/I is also a measure of capacity of the cells.

Most cell sites are usually further divided geographically into a number of sectors and each sector is defined respectively by radio frequency (RF) radiation patterns from antenna components of the respective base station. FIG. 1 illustrates three base stations 110$a$-$c$, which comprise three cells. The size and shape of each cell may vary due to location of the cell (e.g., urban vs. rural area) or other network design factors. Furthermore, network 100 may include more or fewer base stations, or the existing base stations can be arranged in an entirely different manner as well.

The RF radiation pattern from the antenna components of a respective base station produces an air interface, such as link 108, that provides a communication path between repeater 106 and the base station 110$b$. Similarly, repeater 106 communicates with MS 102 through link 104. MS 102 can then communicate with base station 110$b$ through repeater 106. MS 102 can communicate through this path with entities on network 100, such as IP network 116, or with other mobile stations.

Wireless Communications

Wireless signaling between MS 102 and base station 110$b$ may operate according to any wireless network protocol, such as global system for mobile communications (GSM), time division multiple access (TDMA), or code division multiple access (CDMA), for example. The specific protocol depends upon how voice or data signals are transferred between the MSs and base stations, as well as the utilization of transmission frequencies, considering available bandwidth and the network's capacity constraints.

In a CDMA network, cell sites may operate with multiple carrier frequencies. On a given frequency in a CDMA system, multiple communication channels exist, each distinguished by a "Walsh code." Walsh code is a term used for a digital modulation code that distinguishes individual signals on the RF carrier frequency being transmitted. There are 64 possible Walsh codes and each code is 64 bits long for IS-95A and IS-95B (TIA/EIA-95 "Mobile Station-Base Station Compatibility Standard for Dual-Mode Spread Spectrum Systems"), and there are 64 or 128 Walsh codes with each code being 64 or 128 bits long for IS-2000 (TIA/EIA-2000 "CDMA2000 Standards for Spread Spectrum Systems"). The communication channels of the CDMA system that the Walsh code identifies include a pilot channel (Walsh code 0), a sync channel (Walsh code 32), a number of paging channels (Walsh codes 1 possibly through 7), and a number of traffic channels (any remaining Walsh codes).

Each base station 110*a-c* may transmit signals using the same frequencies and using the same group of 64 Walsh codes for pilot, paging, sync, and traffic channels. Therefore, another layer of signal encoding may be required so that an MS can differentiate forward and reverse link signaling through individual sectors of the base stations. In CDMA, each sector is distinguished by a specific pseudo-noise offset (i.e., "PN offset") of a PN-sequence that is used to encode communications with mobile stations operating in the cell.

Two versions of PN sequences are typically used and are defined in the CDMA digital cellular system common air interface standard known as Interim Standard 95 ("Mobile Station-Base Station Compatibility Standard for Dual-Mode Wideband Spread Spectrum Cellular System," TIA/EIA Interim Standard (IS-95)). One sequence is a short PN-sequence that is approximately 15 bits long and can be configured in $2^{15}$ (32,768) different PN sequences. The short PN-sequence (and other PN-sequences) may transmit at a chip rate of about 1.2288 Mchips/sec (mega-chips per second), so that the short PN-sequence repeats about every 26.67 ms (milli-seconds). Another sequence is a long PN-sequence and may have $2^{42}-1$ different patterns (i.e., 4,398,046,511,103 patterns), each 42 bits long.

A useful property of the short and long PN-sequences, and possibly other spreading sequences, is that sections within them, offset from one another, appear to be orthogonal. Individual base stations can utilize the same spreading sequence with a different "starting point" or time delay (usually 64 bits long) to encode forward link signals for each respective sector of a cell site in network 100. Therefore, each sector may encode signals using the PN-sequence offset by a respective time, e.g., a PN-offset. This enables MS 102 to distinguish between sectors of base station 110*b* to enable "handoff" between the sectors, for example, as MS 102 moves into communication with other sectors of base station 110*b*. At any given instant, a mobile station may thus operate in a given sector, and may thereby communicate with the serving base station using the PN offset of that sector.

More specifically, a mobile station operating under CDMA normally maintains in data storage an "active set," which is a list of base station sectors with which the mobile station is in communication. The mobile station actually communicates with multiple base station sectors at a time, to facilitate a soft-handoff process as the mobile station moves among sectors. The mobile station receives pilot signals from multiple base station sectors including those in its active set and those physically neighboring the active set sectors (indicated by a "neighbor list"). When the mobile station detects a neighbor sector having a high enough signal strength compared with the lowest signal strength of its active set sectors, the mobile station sends a pilot strength management message (PSMM) to its primary serving base station/base station controller, and receives in response a handoff direction message (HDM) directing the mobile station to move the neighbor sector into its active set in place of one of the active set sectors. This soft-handoff process continues as the mobile station operates and moves among sectors.

Repeating Wireless Signals

In the exemplary embodiment, the number of sectors to which repeater 106 transmits communications on the reverse link can be minimized to just one sector (one PN offset). However, repeater 106 may still receive on the forward link a plurality of air interface beams, wherein each beam might correspond to a sector within a radio access network. As the repeater passes all of its forward link communications through to a served mobile station, the mobile station is enabled to still perform its normal soft-handoff functions.

Figure 2:
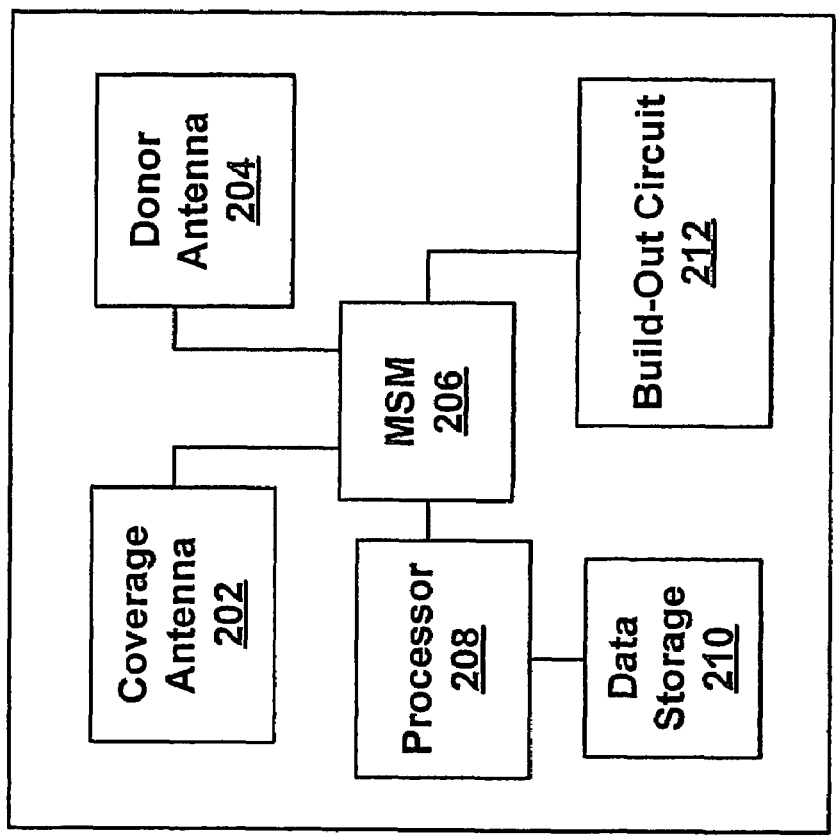
FIG. 2 illustrates an example of a repeater that may operate according to an exemplary embodiment of the present invention.

FIG. 2 illustrates one embodiment of a repeater 200 that may operate according to an exemplary embodiment of the present invention. Repeater 200 includes a coverage antenna 202 that communicates with at least one mobile station, a donor antenna 204 that communicates with a radio access network, a mobile station modem (MSM) 206, a processor 208, data storage 210, and a build-out circuit 212 that boosts communications between the radio access network and the mobile stations. Coverage antenna 202 and donor antenna 204 couple to MSM 206, which couples to processor 208 and to build-out circuit 212. In turn, processor 208 couples to data storage 210. Repeater 200 may be able to receive a signal distorted by transmission losses and to regenerate or replicate the signal. Repeater 200 may be an analog repeater that may only be able to amplify the signal or a digital repeater that can reconstruct a signal to near its original quality.

Coverage and donor antennas 202 and 204 may be any type of antenna or antenna array, and can be configured in any desired manner. For example, coverage and/or donor antennas 202 and 204 may be omni-directional antennas or directional antennas. In addition, coverage and/or donor antennas 202 and 204 may include more than one antenna element. For example, coverage and/or donor antennas 202 and 204 may include multiple antennas each positioned to receive forward link air interface beams from a plurality of sectors, while allowing the repeater to select one air interface beam for communications on the reverse link.

Furthermore, the phase of radiating components can be varied electronically to produce a moving radiation pattern with no moving parts. For example, coverage and/or donor antennas 202 and 204 may be phased array (PA) antennas. A PA antenna comprises many radiating elements each with a phase shifter. The radiating elements may be spaced such that together they can radiate wireless signals to a desired direction. Each element can produce a signal with a fixed amplitude and phase angle for a certain drive voltage. By assembling a number of antenna elements to form the PA antenna, the direction of a main beam (its directivity) can be controlled through the adjustment of the signal amplitude and phase of each antenna element in the array. Beams are formed by shifting the phase of the signal emitted from each radiating element, to provide constructive/destructive interference so as to steer the beams in a desired direction. The signal can be amplified by constructive interference in the main direction. The beam sharpness or directivity can be improved by the destructive interference. The use of the PA antenna has the effect of summing the signal at points in space where it is desirable with constructive inference and taking advantage of destructive interference to cancel out the signal in space where the signal is not desired.

MSM 206 may include a number of components, such as but not limited to, an RF interface, a processor, a vocoder, a codec, and a rake receiver, for example. MSM 206 will receive wireless signals from coverage and donor antennas 204 and 206. All signals will be encoded with the same Walsh codes and the same PN-sequence. Therefore, MSM 206 distinguishes between the signals by identifying PN-offsets using a rake receiver. The rake receiver can do this because the Walsh codes are orthogonal and the PN-sequence is orthogonal to itself at the different offsets.

MSM 206 acquires (locks onto) the strongest base station or sector pilot signal and repeater 200 selects an air interface beam that corresponds to that base station or sector. MSM 206 continually tracks the strongest pilot signal in frequency and in PN-offset. Because all base stations use the same PN-sequences in their pilot signals, except with different offsets, MSM 206 will make a single search through all offsets to find the strongest base station pilot signal. MSM 206 uses the acquired pilot signal to establish synchronism with system timing, which then enables MSM 206 to obtain system control information from messages transmitted by the base station on the forward link's synchronization and paging channels (sync channel-Walsh code 32; paging channels-Walsh codes 1 possibly through 7). The synchronization channel repeatedly broadcasts a message containing identification and timing parameters that include base station and cellular system identification numbers and base station PN-offset indices. MSM 206 can measure the strength of other base station pilots and store information about their strengths in a table in the data storage 210.

MSM 206 then measures, for example, signal-to-noise ratios ($E_C/I_O$) for each PN-offset. Processor 208 will record in data storage 210 the signal characteristic of received signals, such as the PN offsets and corresponding signal-to-noise ratios, for example. Given this data, repeater 200 may then select the air interface beam where MSM 206 detected the strongest signal-to-noise ratio.

In addition, processor 208 may be operable to determine and record in data storage the signal characteristic of the forward link of each air interface beam, and based on the signal characteristic, to select the air interface beam with the most preferable signal characteristic. Processor 208 may also include a programmable digital signal processing engine or an application specific integrated circuit (ASIC), which may be able to execute machine language instructions. Further, data storage 210 may include high-speed random access memory (RAM), or some other high-speed memory device or memory circuitry.

Build-out circuit 212 operates to amplify signals received from MSM 206. The amplified signals can then be transmitted by coverage antenna 202 or donor antenna 204. Build-out circuit 212 may include any number of amplifiers and filters in any type of desired arrangement, for example.

According to the exemplary embodiment, donor antenna 204 of repeater 200 will be a smart antenna such as a PA antenna that can dynamically (e.g., automatically in real time) point a narrow beam in a desired direction for reverse link communications (e.g., by changing the phases of its various elements). In operation, processor 208 will monitor each air interface beam by causing donor antenna 204 to receive on the forward link the plurality of air interface beams. For each air interface beam received, donor antenna 204 will pass the communications to MSM 206. MSM 206 will then pass the communications to coverage antenna 202, where coverage antenna 202 then passes all the communications to a mobile station being served by repeater 200. At the same time, MSM 206 will apply a rake receiver to identify signal characteristics of the wireless signals, such as the PN-offsets in the received signals and to measure a signal-to-noise ratio ($E_C/I_O$) for each PN-offset. Other examples of signal characteristics that MSM 206 may identify are carrier-to-cochannel interference ratio and frame error rate. Processor 208 will record in data storage 210 the PN offsets and corresponding signal-to-noise ratios, or some other signal characteristic, for the forward link of each air interface beam. Given this data, repeater 200 will then select the air interface beam based on the signal characteristic determined by MSM 206. Alternatively, processor 208 may be operable to determine and record in data storage the signal characteristic of the forward link of each air interface beam, and based on the signal characteristic, select the air interface beam with most preferable signal characteristic.

As a result, repeater 200 may select an air interface beam that corresponds to a sector that is likely to carry the least amount of load or that has the most surplus capacity (since the selected air interface beam has a higher signal-to-noise, higher carrier-to-cochannel interference (C/I) ratio, or lower frame error rate). Further, repeater 200 may direct donor antenna 204 to continue to receive the plurality of air interface beams on the forward link, and direct processor 208 to continually monitor the forward link of each air interface beam for its signal characteristics.

Figure 3:
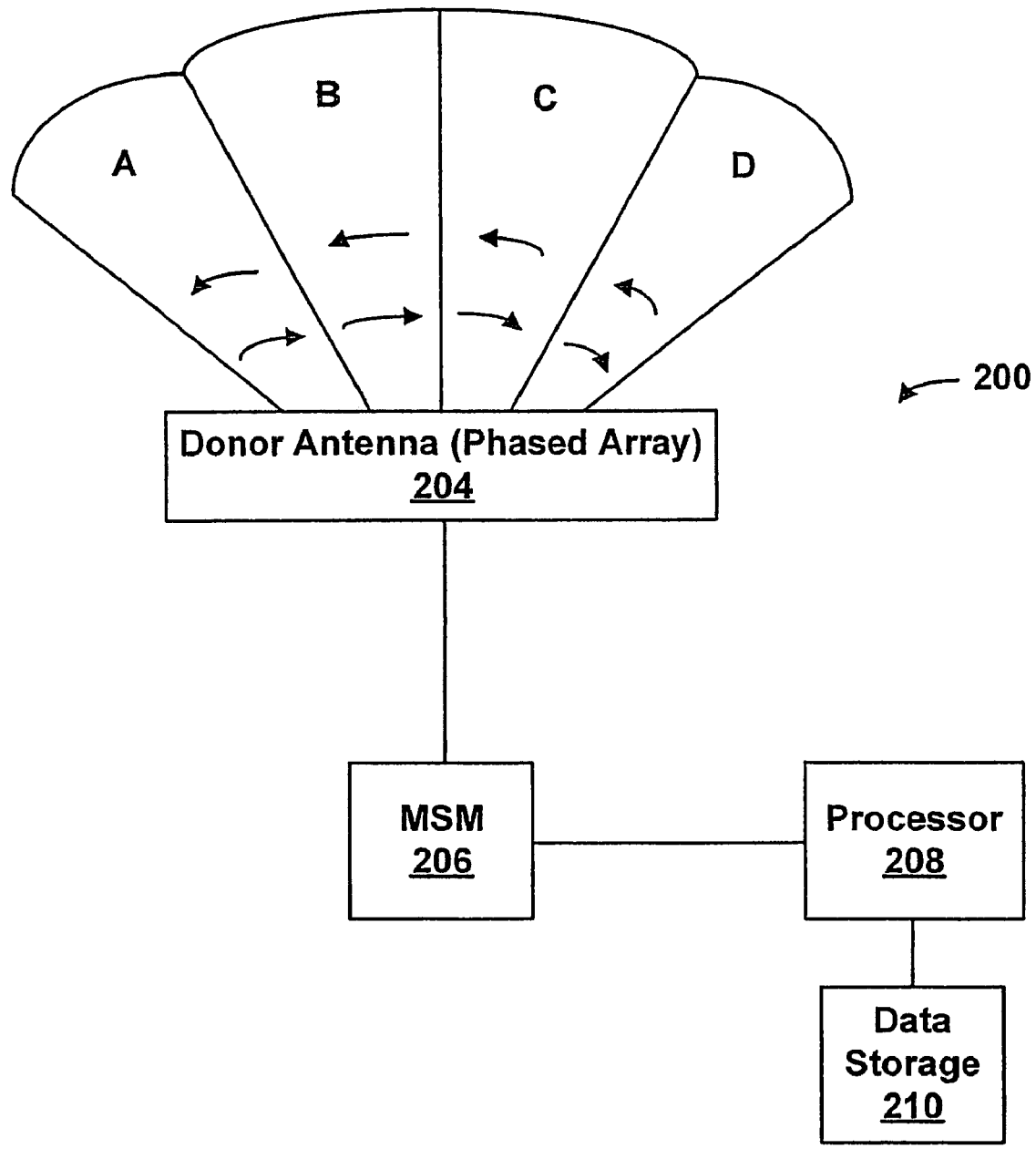
FIG. 3 illustrates one embodiment of a repeater sweeping over a coverage area through increments to gather wireless signals.

FIG. 3 illustrates one embodiment of donor antenna 204 sweeping over a coverage area through increments to gather forward link wireless signals. As shown in this example, donor antenna 204 collects forward link signals in four increments, e.g., A, B, C, D, however more or fewer may be used. Processor 208 may initially direct donor antenna 204 to receive forward link signals from the area denoted by sector A by adjusting the phase angle for each antenna element of the PA antenna. Processor 208 may then direct donor antenna 204 to receive forward link signals from the area denoted by sector B by re-adjusting the phase angle for each antenna element of the PA antenna. Processor 208 can continue to adjust the phase angles of the antenna elements so as to sweep across an entire area to collect forward link signals incrementally. In this manner, processor 208 may scan an area using any number of increments.

As another example, donor antenna 204 may comprise multiple antenna elements, each of which is directed to receive forward link communications from a radio access network. The multiple antenna elements may produce, for example, radiation patterns A, B, C, and D. Processor 208 can then simply "turn on" a specific antenna element to transmit a reverse link air interface beam to a specific base station or sector of the radio access network. Processor 208 can then use this process to collect signals over an entire area.

Figure 4:
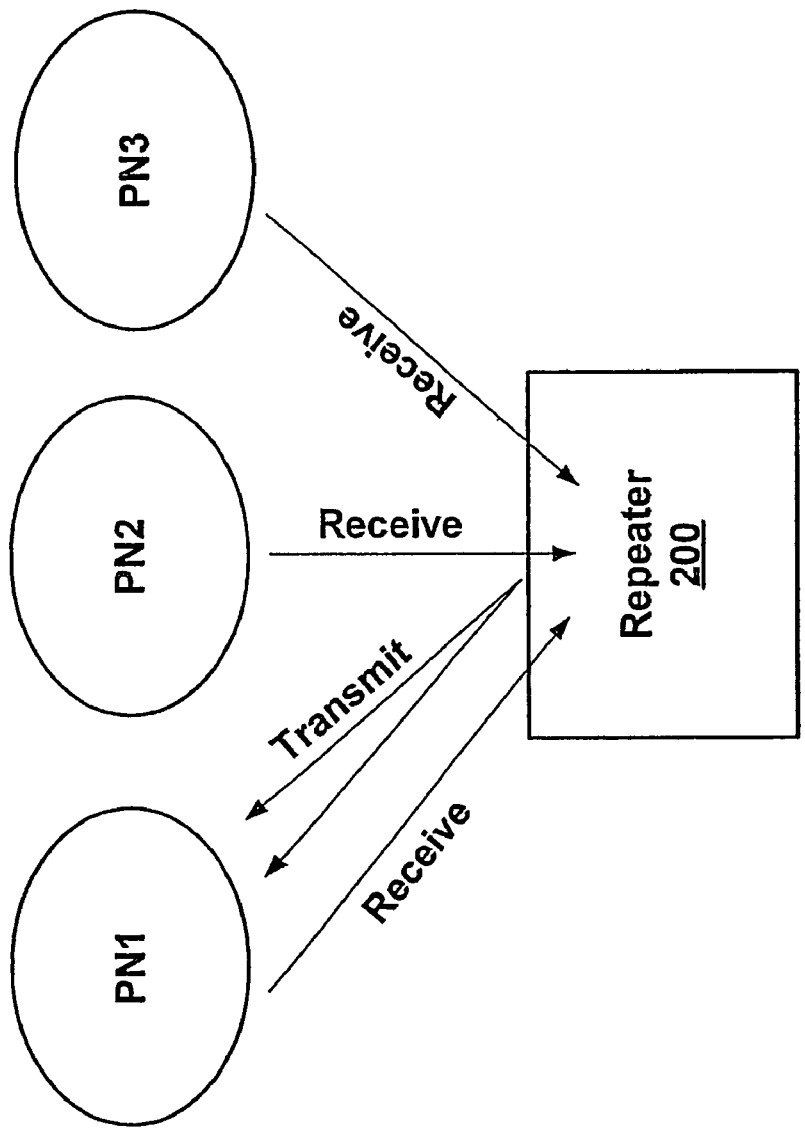
FIG. 4 illustrates one embodiment of dynamically directing a wireless repeater according to the present invention.

In another example, the phase array antenna of the repeater 200 might be able to receive forward link air interface beams from all sectors within its coverage area, and then select the air interface beam whose forward link has the highest C/I, thereby keeping the reverse link of the selected air interface beam active while deactivating the reverse link of the other air interface beams. In this manner, the repeater 200 may effectively only transmit on to the reverse link side of the repeater 200 on the air interface beam that has a PN-offset with the highest C/I. FIG. 4 illustrates one example of this process. The repeater 200 may receive forward link signals that have PN-offsets PN1, PN2, and PN3 from three different coverage areas. The processing engine of the repeater 200 may then determine the PN-offsets of the received signals and the C/I ratio of these signals. In the illustration in FIG. 4, repeater 200 may determine that signals that have PN1 have the highest C/I, and therefore, the phase array antenna needs only to keep active the reverse link of air interface beam whose donor sector is within the coverage area of PN1. Signals that have PN2 and PN3 are not retransmitted on the reverse link, and are therefore cancelled out.

As donor antenna 204 collects forward link signals, processor 208 may note the phase of the PA antenna at which signals were collected, or the antenna element that collected the signals. Processor 208 can store this information in data storage 210 for later use. As described below, processor 208 may then direct donor antenna 204 to radiate reverse link air interface communications on the selected beam (e.g. to the selected base station or sector).

The processor 208 may instruct donor antenna 204 to radiate the reverse link of an air interface beam in a desired direction based on a high signal-to-noise ratio (possibly the strongest) of a given base station. Processor 208 may instruct donor antenna 204 to radiate in a desired direction by adjusting the signal amplitude and phase of each antenna element in the PA antenna, for example, based on the stored information in data storage 210. Processor 208 can query data storage 210 to determine from what sector donor antenna 204 collected signals that had the strongest signal-to-noise ratio. Processor 208 can also determine the desired sector by querying data storage 210 to determine the PN-offset associated with the strongest signal-to-noise ratio. Processor 208, or repeater 200, can then direct donor antenna 204 to radiate reverse link air interface beams at that sector, while receiving forward link air interface beams from all sectors within the coverage area of repeater 200 and passing all of the forward link communications to the mobile station over the coverage air interface.

In this manner, repeater 200 receives forward link air interface beams from a plurality of base stations or sectors (or more generally on a plurality of air interface beams), while transmitting only one reverse link air interface beam, e.g., to a single base station at a time. Of course, the particular base station which repeater 200 sends reverse link air interface beams to may change over time, based on the number of mobile stations in communication with the various base stations, for example.

As a result, repeater 200 may effectively perform a handoff by de-selecting the current air interface beam and selecting an air interface beam that repeater 200 determines to have a higher signal-to-noise ratio, e.g., if repeater 200 detects an air interface beam with a forward link whose signal characteristic is more preferable. Note that an air interface beam whose forward link is more preferable may correspond to a base station or sector that has a smaller load or has surplus capacity. Furthermore, existing repeaters may simply operate to extend the coverage areas of base stations. However, in the exemplary embodiment, repeater 200 will operate to extend the coverage area of the base station that carries a low amount of traffic (possibly the least amount of traffic) at any given point in time so as to attempt to load balance the base stations and sectors and to provide the mobile stations with the strongest possible signals.

Preferably, repeater 200 will periodically determine which base station has the least traffic (or more generally which air interface beam is most preferable) in order to account for changing conditions. For example, repeater 200 may collect signals at predetermined time intervals, such as once an hour, from all transmitting base stations within repeater's 200 coverage area. On the other hand, repeater 200 may continuously collect signals, continuously determine what base station within its coverage area has the least load or most surplus capacity as characterized by having a high signal-to-noise ratio, and further continuously determine what sector of this base station has the least load. In this manner, repeater 200 monitors the loads of the base stations within its coverage areas to dynamically determine when to perform a handoff so that repeater 200 will select an air interface beams that corresponds to a sector that has surplus capacity. Repeater 200 may monitor the loads of the base stations in other manners as well, such as by determining a number of dropped calls, for example. Other examples are possible as well.

Figure 5:
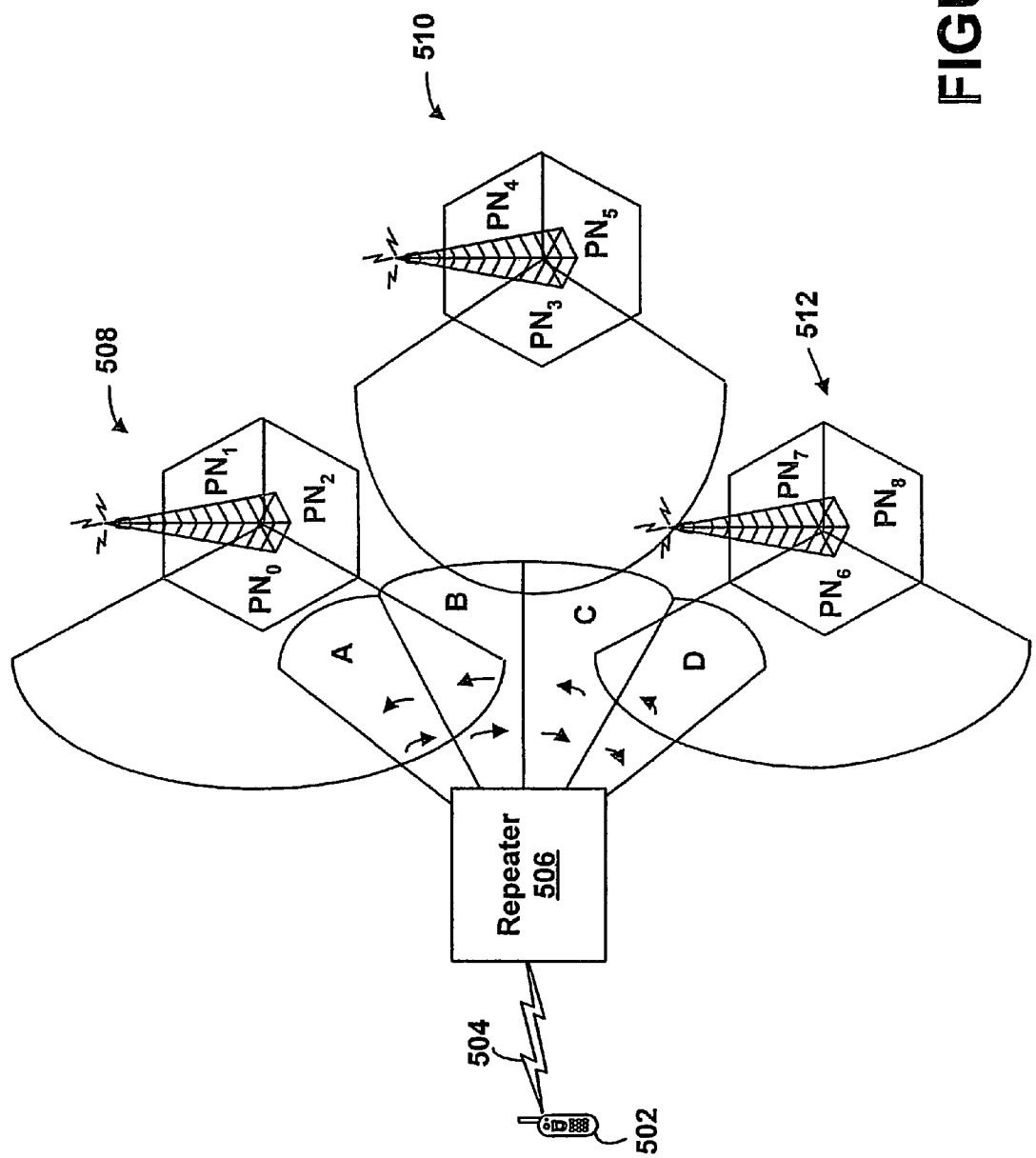
FIG. 5 illustrates another embodiment of dynamically directing a wireless repeater according to the present invention.

FIG. 5 illustrates one embodiment of dynamically directing a wireless repeater. An MS 502 may communicate via wireless link 504 with repeater 506. In turn, repeater 506 may boost the signals, and transmit the signals to whichever base station MS 502 is in communication. MS 502 may then communicate with a single base station on the reverse link, and communicate with multiple base stations on the forward link.

On the reverse link, repeater 506 will transmit signals to either base station 508, 510, or 512. Repeater 506 will collect forward link signals from all base stations within repeater's 506 coverage area, specifically coverage areas A, B, C, and D. While collecting signals, repeater 506 notes from what coverage area the signals were collected. For example, all three base stations 508, 510, and 512 are divided into three sectors, each of which operates according to a respective PN-offset (e.g., $PN_0$-$PN_8$), and repeater 506 notes from which sector signals were collected. (Alternatively, the repeater 506 may simply determine the PN-offsets of received signals as described in FIG. 4). Repeater 506 then determines a C/I ratio for each received signal (by identifying the pilot channels (i.e., Walsh code 0) of the signals and comparing their signal strength to the remaining total noise) and determines a high or the highest C/I ratio among the collected signals. Repeater 506 will then select an air interface beam corresponding to the coverage area in which it received signals having a high C/I ratio. Repeater 506 will therefore send reverse link communications along the selected air interface beam, which corresponds to the sector with a low load (characterized by having a strong pilot signal compared to the amount of interference).

If MS 502 moves between sectors or coverage areas, for example, signal characteristics of the forward links of each air interface beam may change. In order to maintain the integrity of a call when repeater 506 determines that its current serving base station is overloaded (e.g., that the measured C/I ratio of signals is too low due to too much interference), repeater 506 can handoff calls from the current base station to another base station with a stronger C/I ratio. Because repeater 506 passes all forward link air interface beams to MS 502 (including pilot signals), both repeater 506 and MS 502 may both evaluate the strength of the pilot signal received from each sector in their respective coverage areas. Thus, repeater 506, and MS 502 as well, may periodically determine C/I ratios for each coverage area A-D to determine the load of the base stations within these coverage areas, and may each engage in handoff.

For example, suppose repeater 506 is currently selecting to keep active the reverse link of the air interface beam corresponding to base station 508, but repeater 506 determines that base station 512 has a lower load. Repeater 506 may then perform a make-before-break handoff between the air interface beam that corresponds to base station 508, and the air interface beam that corresponds to base station 512. During this make-before-break handoff, the reverse link of air interface beam A of repeater 506 may fade out, while the reverse link of air interface beam D may fade in over a time period such that MS 502 can recognize the pilot signal from base station 512 within this time period to perform the handoff. During the handoff, repeater 506 may send reverse link air interface beams to both base stations 508 and 512 for a short time. Therefore, repeater 506 performs a handoff by fading out the reverse link of the currently selected air interface beam, while at the same time fading in the reverse link of the air interface beam that will be selected. More simply, repeater 506 may perform the handoff by turning off reverse link communications on beam A after establishing reverse link communications on beam D.

Figure 6:
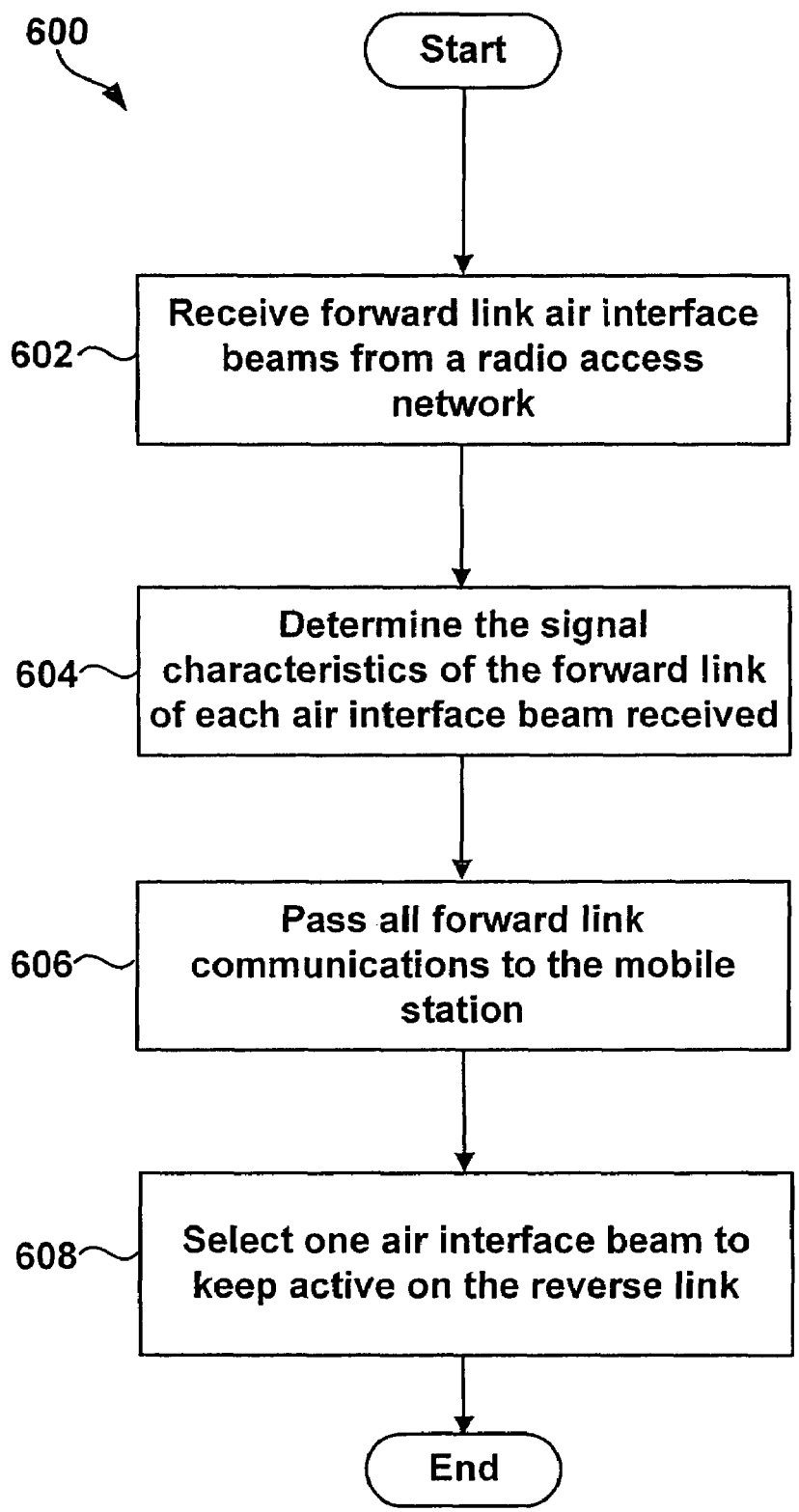
FIG. 6 is a flowchart depicting functional blocks of one embodiment of a method of dynamically directing a wireless repeater.

FIG. 6 is a flowchart depicting functional blocks of one embodiment of a method 600 of dynamically directing a wireless repeater, as illustrated in FIG. 5. Initially, the wireless repeater will receive forward link air interface beams from a radio access network, as shown at block 602. The wireless repeater may be adjusted to receive air interface beams on the forward link from a number of sectors within the radio access network. Next, the wireless repeater will determine the signal characteristic of the forward link of each air interface beam, as shown at block 604. The repeater may determine PN-offsets and signal-to-noise ratios of the received air interface beams, for example, and also the repeater may then determine which sectors within its coverage area has the most surplus capacity.

The wireless repeater may pass all forward link communications to the mobile station being served, as shown at block 606. However, the wireless repeater may select one air interface beam to keep active on the reverse link, as shown at block 608. The selected air interface beam may correspond to a sector that will receive reverse communication links from the repeater. In selecting one air interface beam to keep active on the reverse link, the wireless repeater will be directed to radiate the reverse link amplified air interface beam to one of a number of coverage areas that corresponds to a sector that has the least amount of traffic (or the most available capacity) at this point in time. At the same time, the repeater will also receive air interface beams on the forward link from each sector within the radio access network within the repeater's coverage area, and also pass each forward link communication to a mobile station with which the repeater is in communication with on another air interface.

Pilot Interference Reduction

Within the exemplary embodiment, the repeater is directed to receive multiple forward link communications from a radio access network, while sending reverse link communications to a specified sector within the radio access network. Thus, repeater will still repeat signals on multiple PN offsets, such as signals received from other mobile stations, even though the repeater is directed to radiate reverse link communications to only one base station or one sector. As a further improvement, the exemplary repeater may employ "pilot interference reduction" technology of the type available from companies such as TensorComm Inc. and Nokia. Once an air interface beam is selected, the repeater can further perform pilot interference to only send reverse link signals that have the PN-offset of the selected sector.

Pilot interference reduction technology involves applying destructive interference to remove signals on certain PN offsets. This way, the repeater can be made to send reverse link signals on just the strongest PN-offset, with substantially no interference from signals on other PN-offsets.

The repeater, such as repeater 506, includes a rake receiver that attempts to gather as much signal power as possible by identifying multi-path replicas of transmitted signals and assigning separate correlators to each of them. These correlators are commonly referred to as the rake "fingers" and a rake receiver typically has three of four fingers. Each finger may be configured to independently recover a particular code.

Figure 7:
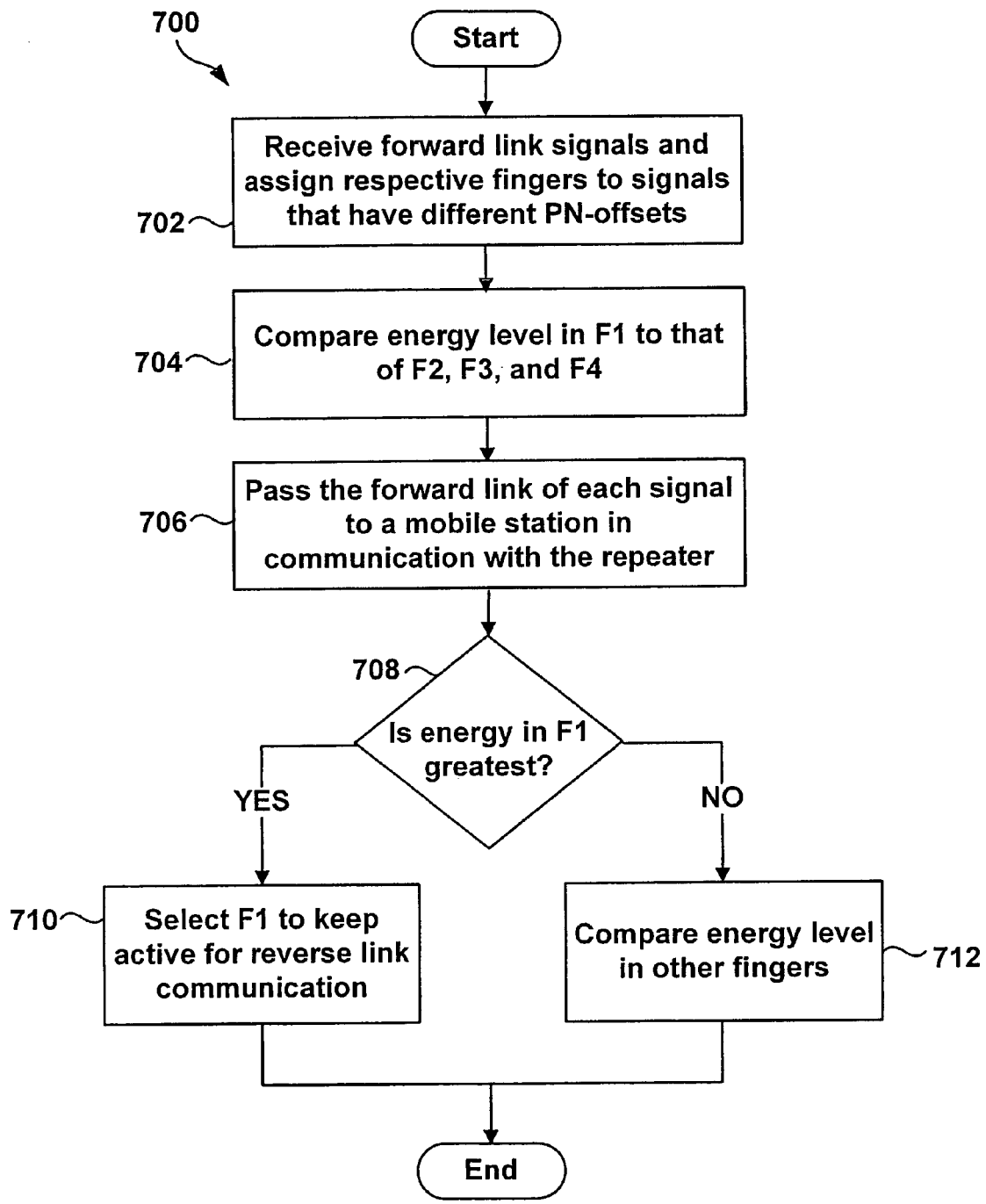
FIG. 7 is a flowchart depicting functional blocks of one embodiment of a method of pilot interference reduction.

FIG. 7 is a flowchart depicting functional blocks of one embodiment of a method 700 of pilot interference reduction. The repeater will receive forward link signals and assign a respective finger to signals that have different PN-offsets, as shown at block 702. For example, suppose the repeater received four forward link signals. Each signal is assigned to a different finger of the rake receiver, e.g., F1, F2, F3 and F4. The rake receiver can then compare energy levels in F1 to that of F2, F3 and F4, as shown at block 704. At the same time, the repeater may also pass the forward link of each signal, F1, F2, F3, and F4, to a mobile station in communication with the repeater, as shown at block 706. After comparing energy levels of the forward link of each signal, if the energy level in F1 is greater than that in F2, F3 or F4, then signals at F1 have the greatest energy, as shown at block 708. The repeater then selects F1 to keep active for reverse link communications, as shown at block 710. The repeater will then receive a reverse link communication from the mobile, and will send the reverse link communication along the selected F1 signal. In this manner, the repeater will send communications it receives from the mobile station on only the reverse link that has a PN-offset that corresponds to F1.

If the energy level at F1 is less than the energy level at any of F2, F3 or F4, then the repeater will compare the energy level at F2 to determine if the signals at F2 have the greatest energy levels. The repeater continues this process until the finger that has the highest energy value is determined, as shown at block 712. In this way, only the signals with the PN-offsets with the best C/I are provided to the transmission side of the repeater. Therefore, the repeater may only repeat reverse link signals to one sector.

This method 700 can be extrapolated to enable the repeater to provide a better replica of a signal that was transmitted on the forward link from the base station. For instance, an input and output signature of the signal (i.e., copies of the signal) to each finger of the rake receiver can be created. The output signatures can then be compared to the original input signal signature. Based on the comparison, noise within the signals can be subtracted out, and a clean signal may be retransmitted by the repeater. For more information on this process, the reader is referred to technology of the type available from TensorComm Inc.

While exemplary embodiments have been described, persons of skill in the art will appreciate that variations may be made without departure from the scope and spirit of the invention. This true scope and spirit is defined by the appended claims, which may be interpreted in light of the foregoing.

What is claimed is:

1. In a wireless repeater, a method comprising:

communicating with a radio access network on a plurality of first air interface beams cooperatively defining a first air interface between the wireless repeater and the radio access network, wherein each first air interface beam defines a respective forward link and a respective reverse link, and wherein the forward link of each first air interface beam defines a respective signal characteristic;

communicating with at least one mobile station on a second air interface;

for each first air interface beam, passing communications received on the forward link of the first air interface beam along to the mobile station on the second air interface;

selecting a given one of the first air interface beams based on the signal characteristic of the forward link of the given first air interface beam; and receiving reverse link communications from the mobile station on the second air interface, and passing the received reverse link communications to the radio access network on only the selected first air interface beam, while continuing to pass forward link communications from each first air interface beam to the mobile station.

2. The method of claim 1, wherein the signal characteristic comprises a carrier-to-cochannel interference ratio, and wherein selecting the given first air interface beam based on the signal characteristic of the forward link of the given first air interface beam comprises selecting the first air interface beam whose forward link has the highest carrier-to-cochannel interference ratio.

3. The method of claim 2, further comprising the wireless repeater determining the carrier-to-cochannel interference ratio respectively of the forward link of each first air interface beam, and comparing the carrier-to-cochannel interference ratio of the forward links of at least two of the first air interface beams in order to select the first air interface beam whose forward link has the highest carrier-to-cochannel interference ratio.

4. The method of claim 1, wherein the signal characteristic comprises a signal to noise ratio, and wherein selecting the given first air interface beam based on the signal characteristic of the forward link of the given first air interface beam comprises selecting the first air interface beam whose forward link has the highest signal to noise ratio.

5. The method of claim 4, further comprising the wireless repeater determining the signal to noise ratio respectively of the forward link of each first air interface beam, and comparing the signal to noise ratio of the forward links of at least two of the first air interface beams in order to select the first air interface beam whose forward link has the highest signal to noise ratio.

6. The method of claim 1, wherein the signal characteristic comprises a frame error rate, and wherein selecting the given first air interface beam based on the signal characteristic of the forward link of the given first air interface beam comprises selecting the first air interface beam whose forward link has the lowest frame error rate.

7. The method of claim 6, further comprising the wireless repeater determining the frame error rate respectively of the forward link of each first air interface beam, and comparing the frame error rate of the forward links of at least two of the first air interface beams in order to select the first air interface beam whose forward link has the lowest frame error rate.

8. The method of claim 1, wherein selecting the given first air interface beam comprises keeping the reverse link of the given first air interface beam active while deactivating the reverse links of the other first air interface beams.

9. The method of claim 1, wherein each first air interface beam corresponds with a respective sector of a radio access network.

10. The method of claim 1, further comprising subsequently handing off reverse link communications from the selected first air interface beam to another first air interface beam in response to a determination that the other first air interface beam has a preferable signal characteristic.

11. The method of claim 10, further comprising making the determination by comparing the signal characteristic of the forward link of the given first air interface beam with the signal characteristic of the forward link of the other first air interface beam.

12. The method of claim 10, wherein the signal characteristic is selected from the group consisting of carrier-to-cochannel interference ratio, signal to noise ratio, and frame error rate.

13. The method of claim 10, wherein handing off reverse link communications comprises performing a make-before-break handoff.

14. A wireless repeater comprising:
a donor antenna operable to communicate with a radio access network on a plurality of first air interface beams cooperatively defining a first air interface between the wireless repeater and the radio access network, wherein each first air interface beam defines a respective forward link and a respective reverse link, and wherein the forward link of each first air interface beam defines a respective signal characteristic;
a coverage antenna operable to communicate with at least one mobile station on a second air interface; and
a mobile station modem,
wherein the donor antenna receives communications on the forward link of each first air interface beam and passes the communications to the mobile station modem,
wherein, for each first air interface beam, the coverage antenna passes communications received from the mobile station modem along to the mobile station on the second air interface,
wherein the wireless repeater selects a given one of the first air interface beams based on the signal characteristic of the forward link of the given first air interface beam, and
wherein the wireless repeater receives reverse link communications from the mobile station on the second air interface, and passes the received reverse link communications to the radio access network on only the selected first air interface beam, while continuing to pass forward link communications from each first air interface beam to the mobile station.

15. The wireless repeater of claim 14, wherein the mobile station modem identifies the signal characteristic of the forward link of each first air interface beam.

16. The wireless repeater of claim 15, wherein the signal characteristic comprises carrier-to-cochannel interference ratio.

17. The wireless repeater of claim 15, wherein the signal characteristic comprises signal to noise ratio.

18. The wireless repeater of claim 15, wherein the signal characteristic comprises frame error rate.

19. The wireless repeater of claim 14, further comprising a processor operable to determine and record in data storage the signal characteristic of the forward link of each first air interface beam and, based on the signal characteristic, to select the given first air interface beam.

20. The wireless repeater of claim 14, wherein the donor antenna comprises a phased array antenna, and wherein, based on the signal characteristic of each beam, a processor directs the phased array antenna to communicate on the given first air interface beam.

* * * * *